H. P. C. BROWNE.
TAXIMETER.
APPLICATION FILED DEC. 21, 1907.

1,160,137.

Patented Nov. 16, 1915.
8 SHEETS—SHEET 1.

H. P. C. BROWNE.
TAXIMETER.
APPLICATION FILED DEC. 21, 1907.

1,160,137.

Patented Nov. 16, 1915.
8 SHEETS—SHEET 4.

Fig. 4.

H. P. C. BROWNE.
TAXIMETER.
APPLICATION FILED DEC. 21, 1907.

1,160,137. Patented Nov. 16, 1915.
8 SHEETS—SHEET 5.

Fig. 5.

H. P. C. BROWNE.
TAXIMETER.
APPLICATION FILED DEC. 21, 1907.

1,160,137.

Patented Nov. 16, 1915.
8 SHEETS—SHEET 6.

Fig. 6.

Witnesses
Geo. F. Bruce.
W. Max. Duvall.

Inventor
H. P. C. Browne
By Wilkinson, Fisher & Witherspoon,
Attorneys

H. P. C. BROWNE.
TAXIMETER.
APPLICATION FILED DEC. 21, 1907.

1,160,137.

Patented Nov. 16, 1915.
8 SHEETS—SHEET 7.

Witnesses
Inventor
H. P. C. Browne,
By Wilkinson, Fisher & Witherspoon
Attorneys.

H. P. C. BROWNE.
TAXIMETER.
APPLICATION FILED DEC. 21, 1907.

1,160,137.

Patented Nov. 16, 1915.
8 SHEETS—SHEET 8.

UNITED STATES PATENT OFFICE.

HARRY P. C. BROWNE, OF NEW YORK, N. Y.

TAXIMETER.

1,160,137.  Specification of Letters Patent.  Patented Nov. 16, 1915.

Application filed December 21, 1907. Serial No. 407,582.

*To all whom it may concern:*

Be it known that I, HARRY P. C. BROWNE, a citizen of the United States, residing at New York, in the county of New York and State of New York, have invented certain new and useful Improvements in Taximeters; and I do hereby declare the following to be a full, clear, and exact description of the invention, such as will enable others skilled in the art to which it appertains to make and use the same.

My invention relates to improvements in taximeters, and the object of my invention is to provide a device of a character which will measure the elements of value in vehicle service, compute and indicate the charge therefor at certain predetermined tariffs and which will also make a printed or written record of such measurements, computations and indications to such extent and in such detail as may be desirable.

One form of my invention, and in which the foregoing objects are attained to a degree meeting certain definite commercial conditions, consists in the construction and combination of parts as hereinafter described and claimed.

In the accompanying drawings.

$a$ represents a casing having hinged thereto the top $b$, these two parts being ordinarily fastened together by the hasp $c$ and padlock $d$. The front of the casing and of the top are cut away, as shown at $e$, and a slit $f$ is left between the cover and the main part of the casing, through which a ticket is delivered to the passenger. Below the slit $f$ there is a rectangular opening $g$, closed by a glass A, behind which is a panel B having windows $h$ for the display of the figures showing the fare, and another window $i$, of twice the width of the windows $h$, for showing the extras, such as the charges for carrying trunks, going to a residence, etc. On the glass A is painted the figure 0 at the right, and a period just at the left of the right-hand window $h$, and an 0 to the right of the left-hand window $i$. This arrangement is adopted because each of the figures represents a charge of a dime, and the 0's are painted on the face of the glass so that the passenger can see the exact charge in dollars and cents. Under the left-hand portion of this panel is printed the word "extras", and under the right the word "fare". The taximeter casing is arranged on, or near, the driver's seat with the panel portion facing into the cab or vehicle in plain view of the passengers.

Outside of the casing is a flag comprising a projecting rod or lever $k$ carrying a sign $m$, on which is marked the words "for hire". This lever $k$ is bent, as shown at $n$, to furnish a convenient handle which the driver may take hold of. Said lever is mounted on a shaft and adapted to be rotated in the direction of the arrow in Fig. 1, for a purpose hereinafter explained.

The fare indicating wheels are arranged to be driven either by clock-work or from the wheel of the cab, the taximeter being especially designed for self-propelling vehicles.

$o$ represents a casing carrying a flexible shaft, the upper part of which is fastened to a head $p$ (Fig. 2) provided with a worm $q$ connected to the drive gearing, as hereinafter explained. $r$ represents a casing in which the clock-work mechanism, which is of the ordinary type and not specifically shown, is mounted, $s$ being a projecting shaft by means of which said clock-work mechanism may be wound up by a key in the usual manner. Through the casing $r$ projects a shaft $t$ driven by the clock-work mechanism and connected to the driving mechanism for the indicator wheels, as hereinafter described. The flexible shaft is also arranged to drive the indicator wheels at different speeds, as hereinafter described.

The reason for providing different means for driving the indicator shafts is this. The purpose of the invention is to automatically measure the two elements of value in cab service (which are, the distance traveled and the time during which the vehicle is kept in waiting) to compute and indicate as it accrues, the charge for such service at any predetermined tariffs and, further, to make a printed record of the operations of the instrument for each trip in duplicate, or in triplicate, of which one copy shall be issued from the taximeter, in the form of a ticket, for the information of the passenger and the other or others be stored in the instrument for the information of the cab owner. When the vehicle is waiting the charge is made on the time element only, a measure of which is contributed by the clock mechanism; when it is running the charge is made according to the distance traveled, a measure of which is contributed by the flexible shaft, which moves through a definite angle with each rotation of the vehicle wheel. But it is proper that the tariff for distance should vary with the number of passengers carried as, for example, 40 cents per mile for one or two passengers and 60 cents per mile for more than two passengers and means to this end are also included in the invention as will appear. Furthermore it is necessary to provide means whereby extra charges may be made for such service as the carrying of luggage, the sending of a vehicle to a distant point on order or the like. All these objects are fully accomplished by the construction set forth in the drawings and in addition at the end of the trip a printed ticket is delivered to the passengers showing the amount of fare and extras charged, a record is kept of the charges made and by turning the rod $k$ the device is returned to its initial position ready for the next passenger. The fare charges for one of these cabs are 40 cents per mile, and the minimum charge is for a half mile or 20 cents. The indicator wheels are so arranged that they register only dime charges, and these charges are made in advance. Similarly the lowest charge for extras is 20 cents, and the highest charge is $2.20, always reckoned in multiples of 20 cents, as hereinafter explained.

Figure 1:
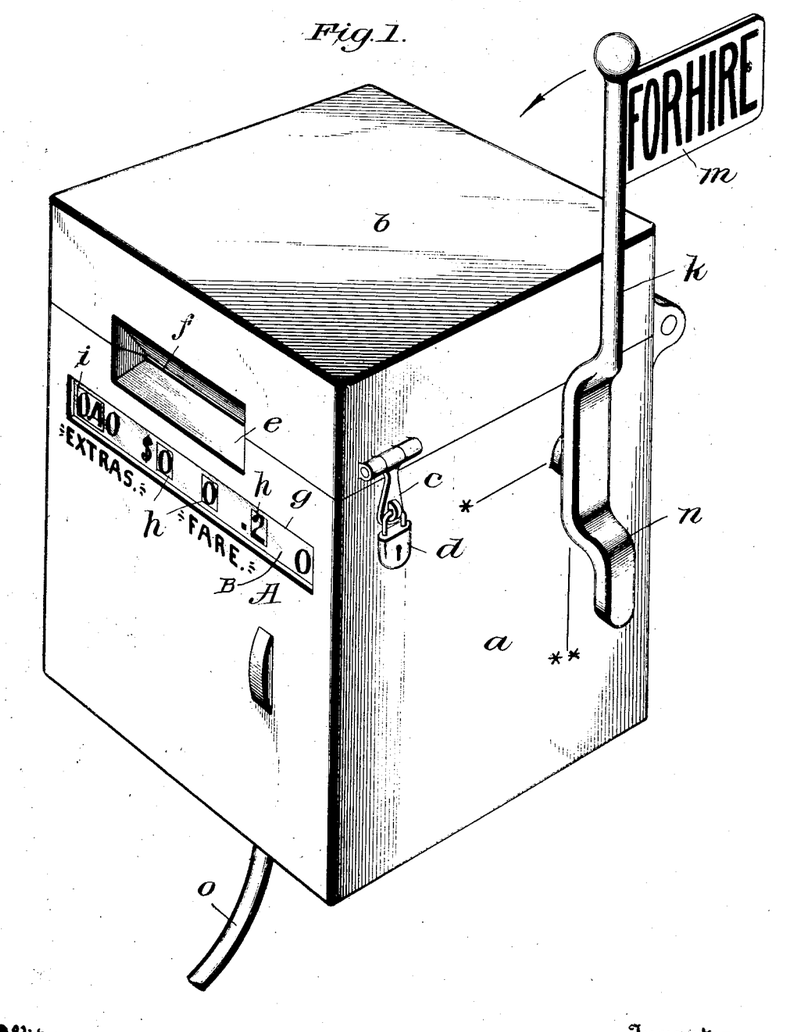
Figure 1 is a perspective view of my complete invention.

In Fig. 1, the parts are represented in their original or initial position, namely, with a charge of 20 cents for fare. As soon as a passenger enters the cab he owes 20 cents, and for this he can ride half a mile provided no stops are made, and, therefore, in Fig. 1, over the word "fare," there appear through the windows $h$ 0 0 2, indicating two dimes, the right-hand figure 0, together with the period on the painted panel, indicating the charge in cents.

Figure 2:
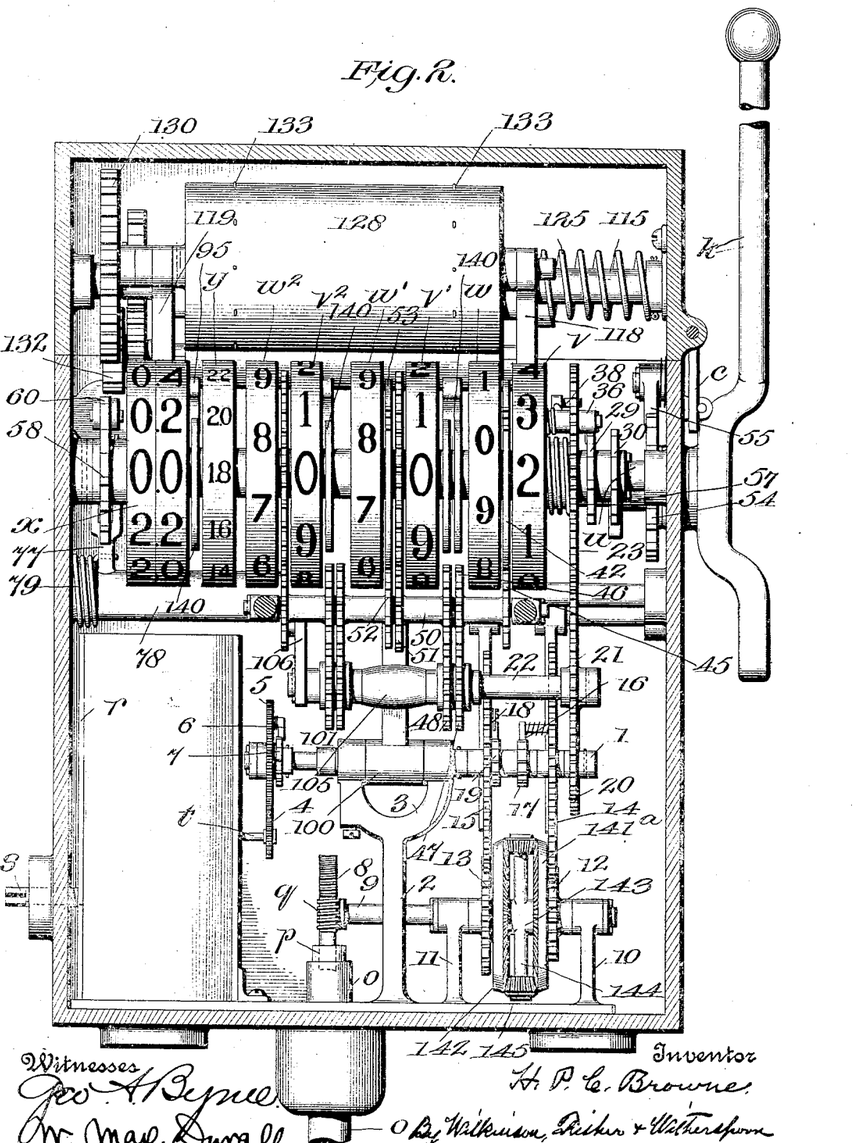
Fig. 2 is a front view of the same, the casing being shown in section.
Figure 4:
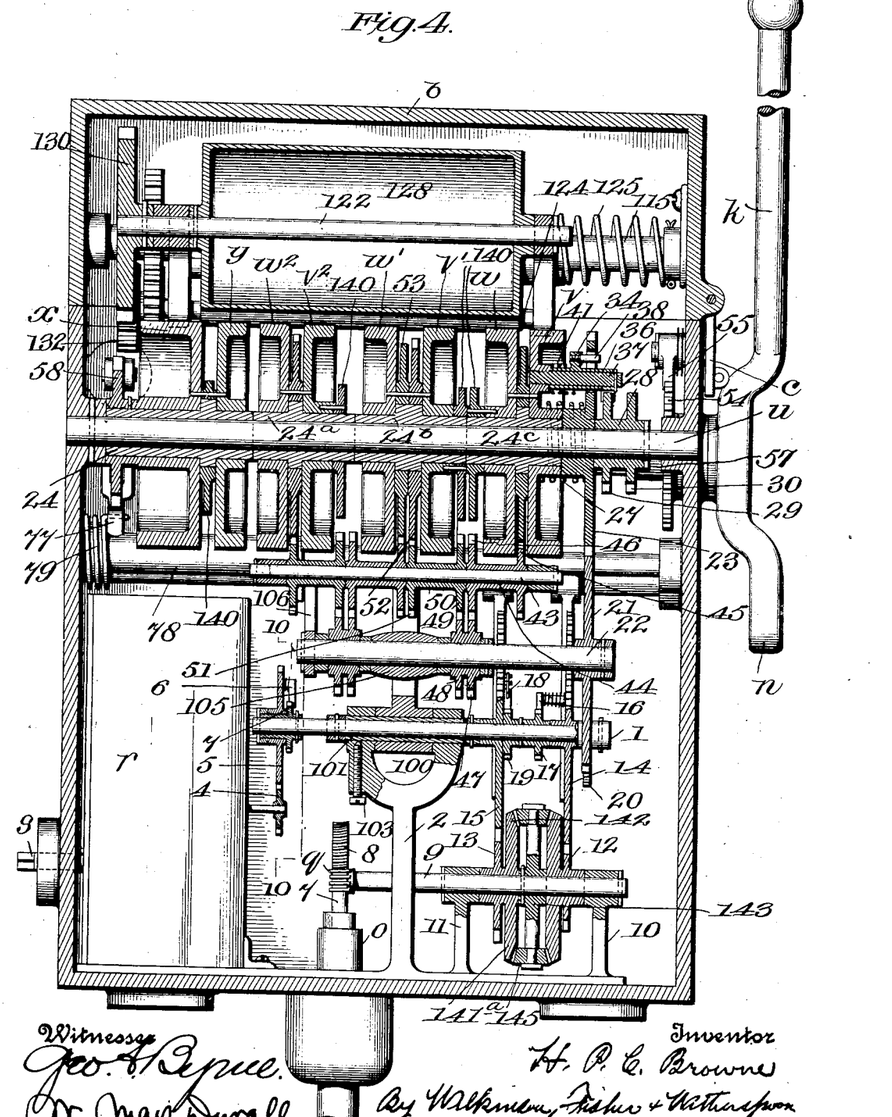
Fig. 4 is a longitudinal section of the machine.

Referring now to Figs. 2 and 4, the indicator and printing wheels are mounted on long sleeves 24, 24$^a$, 24$^b$, and 24$^c$ on the shaft $u$, supported in suitable bearings on the casing of the machine. There are three of these fare-indicating wheels, $v$, $v'$ and $v^2$. Corresponding to the fare-indicating wheels are the printing wheels $w$, $w'$ and $w^2$. These wheels each have on their peripheries ten figures, from zero to nine, the figures on the fare-indicating wheels being indented and the figures on the printing wheels being raised. These wheels are so arranged that the first printing wheel will move in unison with the first indicating wheel, and so on, but for convenience the figures on the indicating and printing wheels are arranged 90° apart. On the same shaft $u$ is mounted the wheel $x$ for extras. This wheel is wider than the other indicating wheels and carries two rows of figures of twelve each, the two rows being separated by periods, as shown in Fig. 2. The figures on the wheel $x$ are all even, however, the odd numbers being omitted. $y$ represents the printing wheel for the extras, having the same series of figures upon it, but raised and arranged so that the figures are 90° from the corresponding figures on the indicating wheel $x$. The wheels $x$ and $y$ are arranged so as to move together.

The driving mechanism will next be described. 1 represents a driving shaft for moving the indicator wheels which is mounted on a bracket 2, having a fork 3. The shaft 1 is driven either from the flexible shaft or from the clock-work mechanism in the following manner. On the shaft $t$ is mounted a spur wheel 4 which meshes with a large spur wheel 5 which is loosely mounted on the shaft 1. On the spur wheel 5 is mounted a spring pressed pawl 6, which engages with the teeth of a ratchet wheel 7 which is pinned or otherwise fastened to the shaft 1. Obviously from the connections described the clock-work mechanism will rotate the shaft 1.

The worm $q$ driven by the flexible shaft meshes with a worm wheel 8 fastened to the shaft 9, which shaft is carried in brackets 10 and 11 supported on the bottom of the casing. Loosely mounted on this shaft, between the bearings 10 and 11, are two gear wheels 12 and 13 of different sizes, so that as the one or the other is used to drive the indicating wheels the motion of said wheels will be varied according to the number of passengers carried. The gear wheel 12 meshes with the gear wheel 14 loosely mounted on the shaft 1, and the gear wheel 13 engages with a gear wheel 15 also loosely mounted on the shaft 1. 16 represents a spring pressed pawl carried by the gear wheel 14, which engages with a toothed ratchet pinion 17 on the shaft 1. Similarly 18 represents a spring pressed pawl on the gear wheel 15, which engages with the pinion 19 fast on the shaft 1. It is obvious, therefore, that the shaft 1 can be rotated either by the rotation of the shaft $t$, or of the gear wheel 12, or of the gear wheel 13, and these motions will not interfere with each other because they are all transmitted to the shaft 1 by a pawl and ratchet connection. When the vehicle is at rest, after it has been engaged, the clock-work mechanism will drive the shaft 1 at a slow speed. When there are one or two passengers in the vehicle, the gear wheel 12 will drive the shaft 1, the charge for one or two passengers being the same, this motion being faster than the motion which would ordinarily be caused by the clock-work mechanism. When there are three passengers in the vehicle, the shaft 1 is driven by the gear wheel 13 at a faster rate than would be the case if a less number of passengers were in the vehicle, and the position of the rod $k$ and the fact whether the vehicle is moving or not determine which one of these three agencies will drive the shaft 1.

On the shaft 1 is fixed a driving gear wheel 20, which meshes with a gear wheel 21 loosely mounted on a shaft 22. The gear wheel 21 meshes with a gear wheel 23 loosely mounted on the shaft $u$, and the movement of the gear wheel 23 transmits motion to the first indicator wheel $v$ in the following manner. See Figs. 4 and 5.

Figure 7:
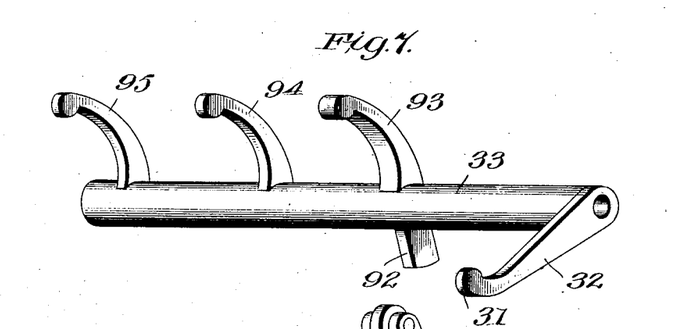
Fig. 7 is a detailed perspective view of the restoring means.

The gear wheel 23 is cut away as shown at 25, a shoulder 26 being formed thereon. 27 represents a strong helical spring connected to the gear wheel 23 and the indicator wheel $v$, and normally tending to move said indicator wheel counter clockwise. 28 repsents a double ratchet pinion loosely mounted on the shaft $u$, having two series of teeth 29 and 30. With the teeth 30 engages the rounded end 31 of an arm 32 on the sleeve 33 (Fig. 7). This holds the ratchet against revolution, while the indicator wheel is moving. With the teeth 29 engages the end of a pawl 35 (Fig. 5), which is mounted on a sleeve 36 (Fig. 4). This sleeve is loosely mounted on a stub shaft 37 attached to the registering wheel $v$ and a coiled spring 41 surrounding said shaft, normally holds said pawl in engagement with the teeth 29. The sleeve 36 has a projection 34 carrying a pin 38. Attached to the wheel $v$ is a pin 39 which projects forward into the recess 25, and serves to properly position the indicator wheel $v$ with reference to the gear wheel 23 when the instrument is reset.

As the gear wheel 23 is rotated, either by the clockwork or the flexible shaft, as above described, the indicator wheel $v$ remains stationary until the corner 26 of the recess 25 strikes the pin 38. This raises the pawl 35 out of contact with one of the teeth 29, whereupon the spring 27 rotates the wheel $v$ counter clockwise the length of one of the teeth 29, bringing the next figure on the indicator wheel $v$ in front of the window. It should be noted that the cut-away portion 25 of the wheel 23 is of such a length that the wheel 23 may turn 72° before it strikes the pin 38, since as said before the charge of 20 cents is always made at the beginning of the trip, which charge is good for a half mile. After the wheel $v$ has once been moved, however, the gear wheel 23 moves the indicator wheel $v$ once for each 36° of its rotation. Thus the regular and slow movement of the wheel 23 results in an intermittent and rapid movement of the indicator wheel $v$.

Between the first indicator wheel $v$ and the first printing wheel $w$ is a gear wheel 42 with a single tooth on its periphery. The wheels $v$, 42 and $w$ are pinned together as shown in Fig. 4, so as to revolve in unison, and the wheel 42 actuates a transfer mechanism of an ordinary type. On the shaft 43 is a sleeve 44 having thereon a gear wheel 45 and a second gear wheel 46. The gear wheel 46 registers with a gear wheel 47 on the shaft 22, which gear wheel 47 has fastened to it, or made integral with it, another gear wheel 48 which meshes with a gear wheel 49 on the sleeve 50 on the shaft 43. The sleeve 50 has on it another gear wheel 51, which meshes with a large gear wheel 52 resting against the second indicator wheel $v'$. Adjacent to the gear wheel 52 is another gear wheel 53 with a single tooth on its periphery. The wheels $v'$, $w'$, 52 and 53 are all connected together to revolve in unison, so that the wheel $v'$ will advance one-tenth of a revolution for each revolution of the wheel $v$. By precisely similar gearing the wheel $v'$ operates the wheel $v^2$.

Figure 5:
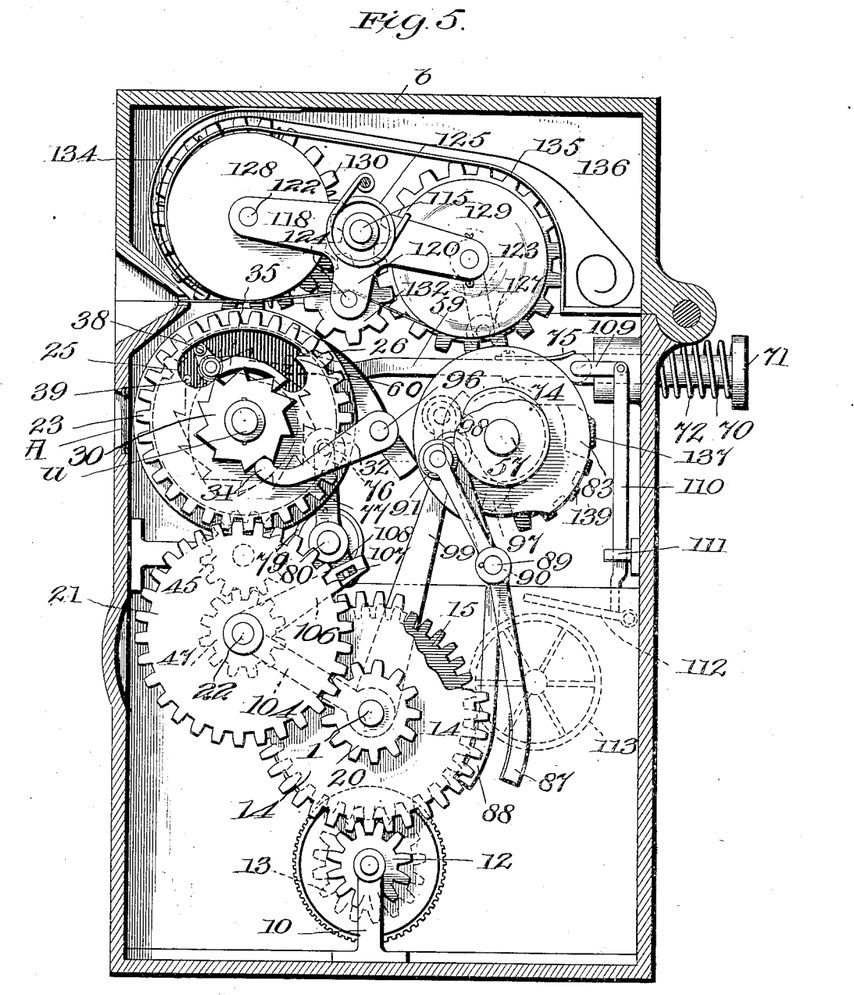
Fig. 5 is an end view of the same, the casing being shown in cross section.
Figure 6:
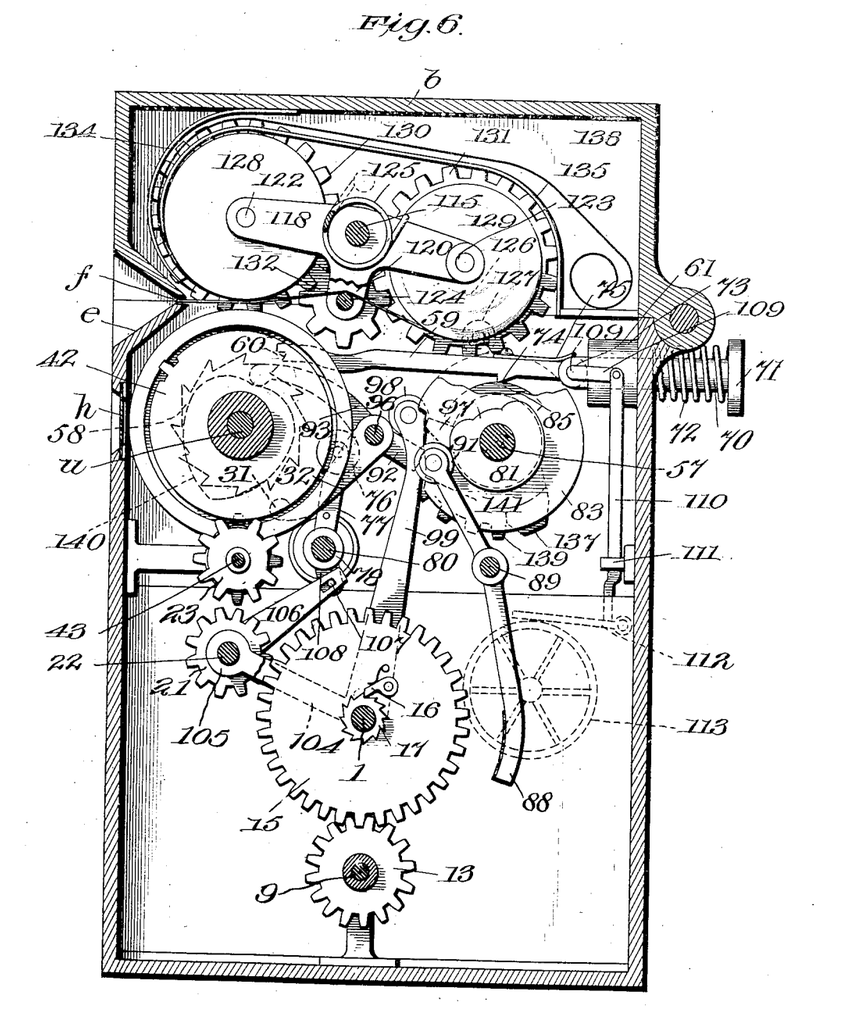
Fig. 6 is a cross section of the same.

The means for indicating the extras will next be described. On the sleeve 24 is mounted the extra wheel $x$ and the printing wheel therefor, $y$, which are pinned together as shown in Fig. 4, so as to move in unison. Made integral with the hub of the wheel $x$ is a ratchet wheel 58, which is adapted to be operated by a long pawl 59 (Figs. 5 and 6). This pawl has a forked end 60, adapted to engage the teeth of the ratchet wheel 58, and its rear end is pivotally mounted at 61 in one end of the rod 70, provided with a button 71 and encircled by a spring 72, which rod passes through a bearing 73 on the inside of the casing. The pawl 59 also has a downwardly extending projection 74 resting on a cam on the shaft 57, and a spring 75 is provided which tends to keep said pawl in its lowest position. Obviously the driver, by pressing in on the button 71, the parts all being in the position shown in Fig. 5, will move the ratchet wheel 58 one tooth every time the button 71 is pressed in. The ratchet wheel 58 has twelve teeth upon it corresponding to the twelve sets of figures on the wheel $x$.

The ratchet wheel 58 is kept in position, except when moved by the pawl 59, by means of a roller 76, which is carried on the upper end of an arm 77, which arm projects upwardly from the end of a sleeve 78 around which is coiled a spring 79, which tends always to hold the roller 76 against the ratchet wheel 58. The sleeve 79 is mounted on a shaft 80 extending through the casing.

Obviously when the parts are in the position shown in Fig. 6, that is to say when the lever $k$ is in the position shown on Fig. 1, the pawl 59 may be pushed in repeatedly without operating the ratchet wheel 58, because it is raised so that its hooked end 60 is above the corresponding tooth on the ratchet wheel 58, as shown in Fig. 6.

Figure 9:
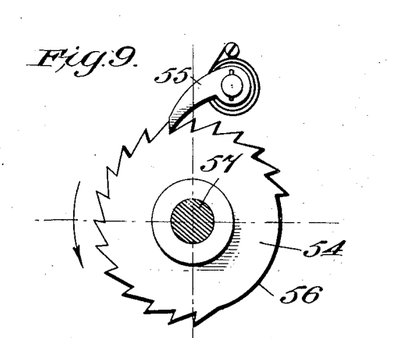
Fig. 9 is a detailed view of pawl and ratchet for the operating lever.
Figure 10:
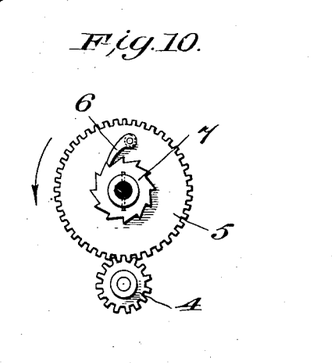
Fig. 10 is a side elevation of the driving gear connecting with the clock mechanism.

The shaft 57 which carries the operating lever $k$ is located just behind the shaft $u$, and on this shaft 57 is mounted a ratchet pinion 54 (Fig. 9) toothed for about three-quarters of its circumference, with which a spring operated pawl 55 engages, which is carried on a stub shaft on the casing. When the lever $k$ is turned 90° from the position shown in Fig. 1, it indicates that not more than two passengers have entered the vehicle and that the indicating mechanism has commenced to operate on the low tariff. When this rod is turned 180° from the position shown in Fig. 1, (i.e. to the position indicated by * *) it indicates that three or more passengers have entered the vehicle, and that the indicating mechanism is in operation on the higher tariff. Owing to the blank space 56 on the periphery of the wheel 54, the driver can move the rod back from the 180° position to the 90° position. The driver is thus able to change from the low tariff to the high and back to the low again at will according as passengers enter and leave the cab during the trip. If, however, the driver moves the lever $k$ through an arc of more than 180° he cannot then move it backward but must move it forward, to restore it to its original position, and in this forward movement the printing and delivery mechanism will be operated as hereinafter described.

Usually speaking the driver can move the rod $k$ to positions near enough to 90°, 180° and 270° from the position shown in Fig. 1, by his eye, the parts being so arranged that an exact adjustment is not needed. If desired, however, lines may be painted on the casing $a$ showing these three different positions as shown in Fig. 1. Of course, it is desirable that when no passenger is in the vehicle, the indicating mechanism should not be moved, even though the vehicle is in motion itself, and for this purpose means are provided whereby when the lever $k$ is in the position shown in Fig. 1, the gearing which operates the indicating wheels will be disconnected, being thrown into the position shown in Fig. 6.

Figure 3:
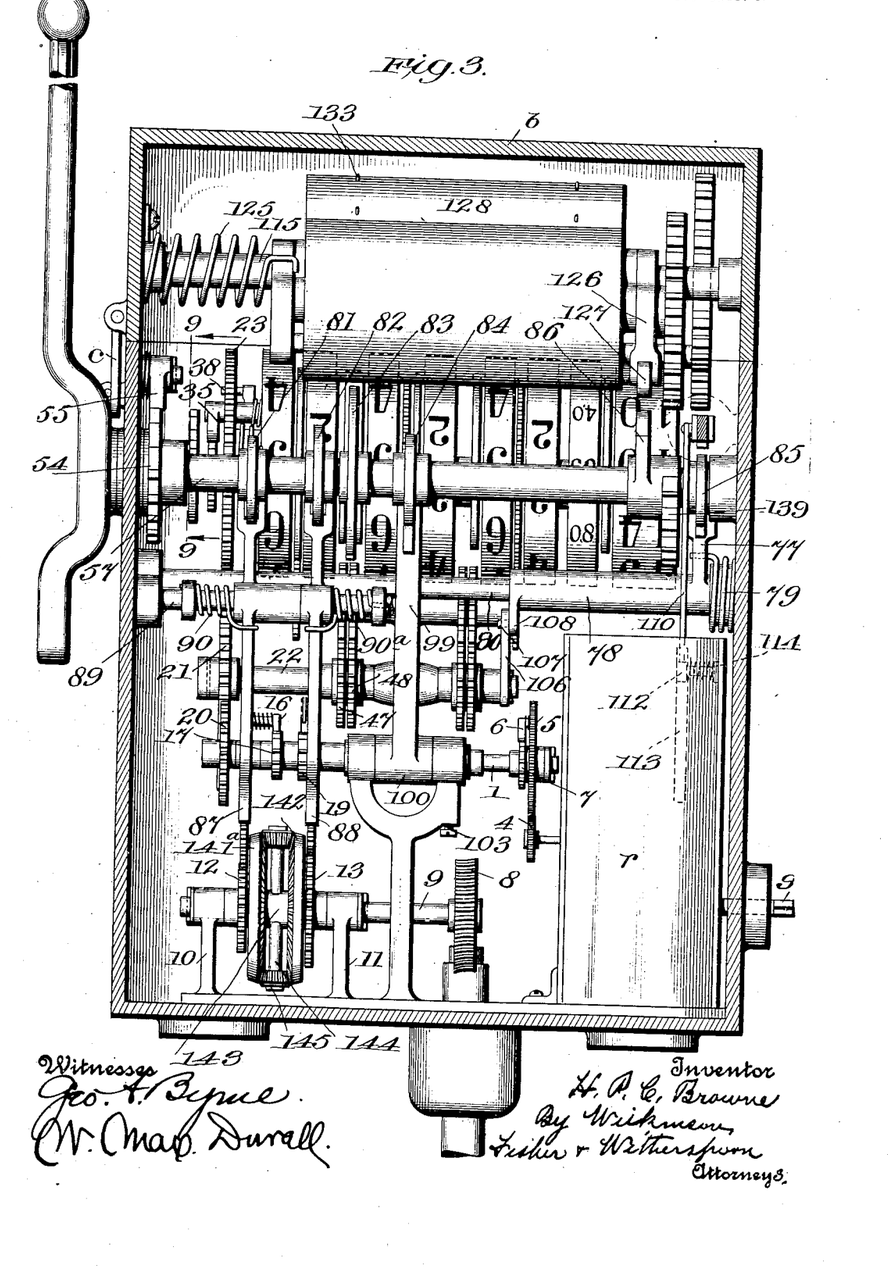
Fig. 3 is a rear view of the same, the casing being shown in section.
Figures 12, 13:
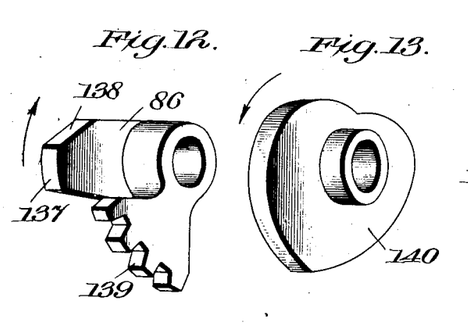
Fig. 12 is a detailed view of the cam and segmental gear wheel associated with the printing and strip feeding mechanism.
Fig. 13 is a detailed view of one of the cams employed for restoring the printing and registering wheels to initial position.
Figure 14:
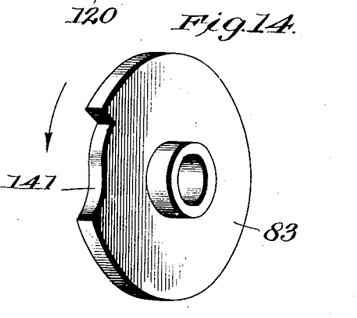
Fig. 14 is a detailed view of the cam for releasing the registering and recording wheel restraining mechanism.
Figure 15:
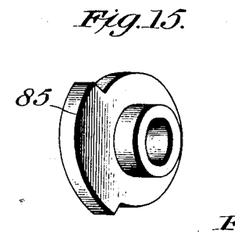
Fig. 15 is a detailed view of the cam for actuating the restoring means.
Figure 16:
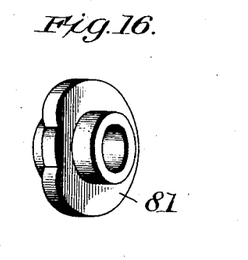
Fig. 16 is a detailed view of one of the cams for operating the brake.
Figure 17:
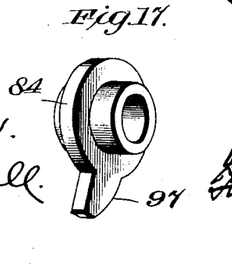
Fig. 17 is a detailed view of the cam for disengaging the gearing.

The means for shifting the parts from the position shown in Fig. 6 to the position shown in Fig. 5, will next be described. On the shaft 57 (Fig. 3), to which the operating lever $k$ is attached, are a number of cams. The first two cams 81 and 82 are for operating brakes, and one of these cams is shown in perspective in Fig. 16. The third cam 83, shown in perspective in Fig. 14, is for operating the restoring mechanism, part of which is shown in Fig. 7. The fourth cam 84, shown in perspective in Fig. 17, is for disengaging the gearing. The fifth cam 85, is for holding the pawl 59 in the position shown in Fig. 6, and the sixth cam 86, shown in Fig. 12, is for operating the printing and ticket delivery mechanism.

The office of the braking means is to prevent the rotation of either the gear wheel 12 or the gear wheel 13, as the case may be. 87 and 88 represent the brakes for the gear wheels 12 and 13, respectively. Each of these brakes consists of a long arm having a sleeve at its center mounted on the shaft 89, springs 90, 90$^a$ normally serving to hold said brakes in contact each with its corresponding gear wheel. The upper end of each of these arms terminates in a roller 91 adapted to contact with one of the braking cams 81 and 82. These cams are so arranged with respect to each other on the shaft 57 that one of them is in engagement with its corresponding gear wheel, and the other is disengaged, as shown in Fig. 5.

The depression in the cam 83 acts to disengage the end 31 of the part 32 from the teeth 30 of the ratchet pinion 28, and the periphery of this cam is adapted to strike against a projecting arm 92 projecting from the sleeve 33, which sleeve also carries projecting arms 93, 94 and 95 having rounded ends for a purpose hereinafter described. The sleeve 33 is mounted on the transverse shaft 96 (Fig. 5).

Figure 8:
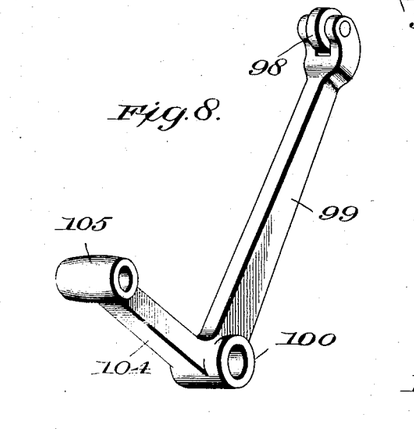
Fig. 8 is a detailed view of the gearing disconnecting lever.

The cam 84 operates to disengage the gearing for the indicator wheels, moving them from the position shown in Fig. 5 to that shown in Fig. 6, the latter being the position when the vehicle is for hire and the apparatus is in the position shown in Fig. 1. The cam 84 has a long projecting tooth 97, and this tooth is adapted to strike a roller 98 on the arm 99. This arm 99 terminates in a sleeve 100, which sleeve is mounted on a sleeve 101 secured in the bearing 2 by a set screw 103. Made integral with the sleeve 100 is an arm 104, the upper end of which terminates in a sleeve 105, this construction being shown detached in Fig. 8. The sleeve 105 serves as a bearing for the shaft 22, on which is mounted the gear wheel 21 meshing with the gear wheel 23, this shaft also carrying a part of the transfer gearing as above described. Obviously a rotation of the cam 84 will throw the parts from the position shown in Fig. 5 to that shown in Fig. 6, and this happens just after the printing takes place.

Secured to the shaft 22, near one end thereof, is an upwardly projecting arm 106 having a slot near its upper end with which slot a pin 107, carried by an arm 108, engages, which arm projects downwardly from the sleeve 78. The purpose of this construction will be described when the means for restoring the parts to their initial position are described.

When the lever $k$ is turned from the position shown in Fig. 1, to a horizontal position, it at once releases the clock-work mechanism by the following means. The shaft 57 being turned carries with it the cam 85 from the position shown in Fig. 6 to that shown in Fig. 5, whereupon the spring 75 forces down the pawl 59. To the pivot 61 of the pawl 59 is attached an arm 109, to the end of which is pivoted a link 110 which passes through a clip 111, and the lower end of which engages a brake 112 for the balance wheel 113 of the clock-work mechanism. A spring 114 (Fig. 3) tends to lift said brake out of engagement with said balance wheel, which action occurs as soon as the pawl 59 drops, thereupon the clock mechanism begins to run, the time begins to register against the passenger and the driver can operate the button 71 to show the extras.

Figure 11:
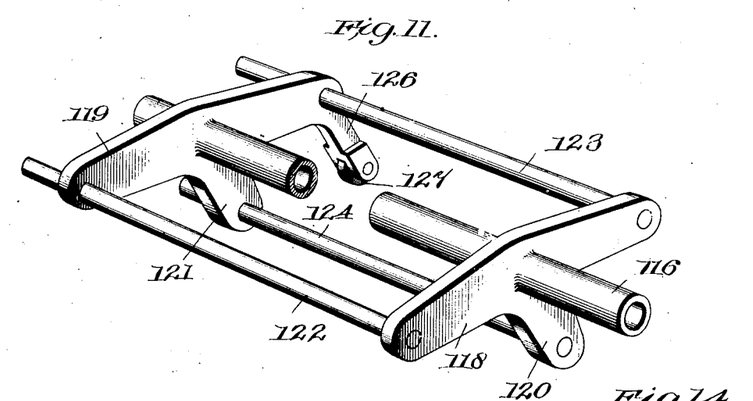
Fig. 11 is a detailed perspective view of the oscillating frame which carries the printing platen and strip feeding reel.

The mechanisms for printing the record and delivering the printed ticket will next be described. Near the top of the machine is mounted a shaft 115, and on this shaft a frame is mounted to oscillate, which frame is shown detached in Fig. 11, composed of a long sleeve 116 made integral with the end pieces 118 and 119, (broken away in Fig. 11) and provided with downwardly extending arms 120 and 121. Joining the ends of the pieces 118 and 119 are two rods or shafts 122 and 123, and joining the ends of the arms 120 and 121 is a guide bar 124. On the shaft 115 is wound a strong spiral spring 125, which normally tends to hold the parts in the position shown in Fig. 6. To the frame 119 is attached a downwardly extending arm 126 which terminates in a roller 127.

On the shaft 123 is journaled the drum 129 carrying, rolled upon it, the one upon the other, a strip of tickets suitably printed with serial or other identification numbers and perforated across the strip for the more ready detachment of the printed ticket, and one or more record strips similarly printed or numbered. The ticket and record strips are further perforated longitudinally with holes spaced apart and across the strip to register with the pins 133 on the drum 128.

On the shaft 122 is pinned the drum 128, the function of which is to draw forward the ticket and record strips by means of the pins 133 set in it and also to press the strips upon the printing wheels in the action of printing, as will be described.

The paper strips are led from the drum 129 over the guide bar 124 and under the drum 128, the pins 133 on the surface of the drum 128 engaging in the perforations, as described. Thence the ticket strip is fed through the slit $f$. The record strips, however, pass up between the curved guides 134 and 135. The guide 135 passes over both drums and has its front end in close proximity to drum 128, a space 136 being provided at the rear to receive the printed record strip or strips.

In the apparatus shown the numbers are printed through the paper in the following manner. Each record strip has the surface next the printing wheels coated with carbon and the drum 128 has its surface provided with a carbon coating. If desired separate carbon strips may be provided, or, in fact, any suitable printing means may be employed.

On shaft 122 is pinned a gear wheel 130 meshing with one-half of a double gear wheel 132 journaled loosely on the shaft 124 and of which the other half meshes with the gear wheel 131 journaled loosely on the shaft 123.

The printing and delivery means is operated by the cam 86 on the shaft 57. This cam comprises a sharply projecting portion 137 beveled off at 138, and another portion with gear teeth 139, the two together occupying about 90° of the periphery of the cam. As the lever $k$ is rotated from its 180° position to the 270° position, the raised portion 137 of the cam strikes the roller 127 and forcibly throws the drum 128 down upon the paper and upon the printing wheels thereunder against the tension of the spring 125. This action is but momentary, and after the portion 137 has passed underneath the roller the teeth 139 of the cam engage with the teeth of the gear wheel 131, rotating the drum 128 a definite distance and forcing the printed end of the strip of tickets out through the slot $f$, and the record strip or strips coming up between the parts 134 and 135, leaving a permanent record in the machine.

The means for restoring the indicating wheels to their initial position, as shown in Fig. 1, during the rotation of the rod $k$ from its 270° position to the position shown in Fig. 1, will next be described. On the shaft $u$ are mounted a number of heart-shaped cams 140, shown in perspective in Fig. 13. Two of these cams are shown between the wheels $w$ and $v'$, being secured to said wheels respectively, a third shown attached to the wheel $v^2$ and the fourth between the wheels $x$ and $y$. These cams are engaged by the rounded ends of the arms 93, 94 and 95 carried on the sleeve 33, when the cut-away portion 141 of the cam 83 comes opposite the arm 92 carried by the sleeve. This happens during the passage of the rod $k$ through the arc between 270° and 360° or the initial position. The dropping of arm 92 into the cut-away portion of cam 83 also moves the rounded end 31 of the arm 32 out of engagement with the teeth 30 of ratchet wheel 28. At the same time the projecting part of the cam 84 strikes the roller 98, moves the arm 99 and the parts operated thereby from the position shown in Fig. 5 to that shown in Fig. 6, as already described. This movement leaves the indicating wheels $v$, $v'$ and $v^2$ free to move under the pressure of the arms 93 and 94 on the heart shaped cams 140. It also throws the roller 76 out of engagement with the ratchet wheel 58 and the extras-indicating wheel $x$ is free to move, therefore, under the pressure of arm 85 on its heart shaped cam. These cams 140 together with these wheels are therefore revolved until the rounded ends of the arms 93, 94 and 95 reach the depressions in the cams. The movement is thus stopped, the parts being then again in the position shown in Fig. 1.

The gears 12 and 13 which are loosely mounted on the shaft 9 are driven in the following manner. Made integral with the gears 12 and 13 or attached thereto are beveled gears 141ᵃ and 142. Fastened to the shaft 9 is a hub 143 carrying spider arms 144. On the outer ends of these spider arms are loosely mounted beveled gear pinions 145 meshing with the gears 141 and 142.

In the apparatus shown the ratio between the teeth of the pinion 13 and the gear wheel driven by it is 16:32, while the ratio between the gear wheel 12 and the gear wheel driven by it is 12:36, so that one of these gear wheels will drive the indicator wheels one and one-half times as fast as the other. These ratios may, of course, be varied to accord with any desired tariff.

As hereinbefore stated the precise construction and combination of parts described in the foregoing is calculated to meet certain definite commercial conditions. Such conditions vary greatly. Instead of its being desired to record only the total of the charges for each trip it may be found desirable to include a series of totalizing wheels of the same general form as the indicating wheels $v$, $v'$, $v^2$ and $x$, with their printing wheels similar to $w$, $w'$, $w^2$ and $y$, but arranged without resetting means and therefore operating continuously and recording the total of all charges from the point of beginning. Or it may be desired to record the elements of value in the service, (that is to say, the waiting time and distance traveled) directly, rather than to record the charges resulting from the application to such elements of value of the tariffs. Any and all of these conditions may be readily met without departing from the spirit and scope of my invention and I do not limit myself to the precise construction and combination herein described, but

I claim—

1. Fare printing types, means for actuating the same in accordance with a pre-determined rate, ticket feeding mechanism, impression mechanism coöperating with said fare printing types for printing on the tickets, and setting mechanism controlling the operative relation between said fare printing types and the actuating mechanism and also controlling said impression mechanism.

2. A printing wheel carrying fare printing types, means for revolving the same in accordance with a pre-determined rate, ticket feeding mechanism, multiple impression mechanism coöperating with said fare printing types for printing a number of tickets at once, and setting mechanism controlling the operative relation between said type wheels and their actuating mechanism and also controlling said impression mechanism.

3. In a taximeter the combination of registering mechanism; actuating mechanism for said registering mechanism; means for connecting and disconnecting said actuating mechanism and said registering mechanism; a resetting mechanism; a printing mechanism; and a device for actuating said resetting mechanism, said printing mechanism, and said means for connecting and disconnecting said actuating and registering mechanism, substantially as described.

4. In a taximeter the combination of registering mechanism; a gearing having a differential element for actuating said registering mechanism from the vehicle; means for controlling the differential element of said gearing to actuate the registering mechanism at any one of a plurality of different pre-determined rates; a resetting mechanism; and a device for actuating the differential control and the resetting mechanism, substantially as described.

5. In a taximeter the combination of registering mechanism; a gearing associated with the registering mechanism; a second gearing for actuating the register mechanism gearing from the vehicle; means for connecting and disconnecting said gearings; a differential element associated with one of said gearings; means for controlling the differential element of said gearing; a resetting mechanism; and a device for actuating the gearing connecting and disconnecting means, the differential control, and the resetting mechanism, substantially as described.

6. In a taximeter the combination of registering mechanism; a resetting mechanism; a gearing having a differential element for actuating said registering mechanism from the vehicle; means for moving the registering mechanism to register initial fare; means for controlling the differential element of said gearing to actuate the registering mechanism at any one of a plurality of different predetermined rates; and a device for actuating the differential control, and the resetting mechanism, substantially as described.

7. In a taximeter the combination of registering and recording mechanism; a gearing for actuating the registering and recording mechanism; means for imparting any one of a plurality of different predetermined rates of speed to said gearing; a printing mechanism associated with the recorder mechanism; a resetting mechanism; and a device for actuating said means, the printing mechanism, and the resetting mechanism, substantially as described.

8. In a taximeter the combination of registering and recording mechanism; a gearing for actuating the registering and recording mechanism; means for imparting any one of a plurality of different predetermined rates of speed to said gearing; means for controlling said means; a printing mechanism associated with the recorder mechanism; a paper feeding mechanism associated with the printing mechanism; a resetting mechanism; and a device for actuating said controlling means, the printing and paper feeding mechanisms, and the resetting mechanism, substantially as described.

9. In a taximeter the combination of registering and recording mechanism; a gearing having a differential element for actuating the register and recorder mechanism from the vehicle; means for controlling the differential element of said gearing to actuate the register and recorder mechanism at any one of a plurality of different predetermined rates; a printing mechanism associated with the recorder mechanism; a resetting mechanism; and a device for actuating the differential control, the printing mechanism, and the resetting mechanism, substantially as described.

10. In a taximeter the combination of registering and recording mechanism; a gearing having a differential element for actuating the register and recorder mechanism from the vehicle; means for controlling the differential element of said gearing to actuate the register and recorder mechanism at any one of a plurality of different predetermined rates; a printing mechanism associated with the recorder mechanism; a paper feeding mechanism associated with the printing mechanism; a resetting mechanism; and a device for actuating the differential control, the printing and paper feeding mechanisms, and the resetting mechanism, substantially as described.

11. In a taximeter the combination of registering and recording mechanism; a gearing associated with said mechanism; a second gearing for actuating the first named gearing; means for connecting and disconnecting the second gearing and said first named gearing; a differential element associated with one of said gearings for actuating the first named gearing at any one of a plurality of different predetermined rates; means for controlling the differential element of said gearing; a resetting mechanism; a printing mechanism associated with said recording mechanism; a paper feeding mechanism associated with said printing mechanism; and a device for actuating the gearing connecting and disconnecting means, the differential control, the printing mechanism, the paper feeding mechanism, and the resetting mechanism, substantially as described.

12. In a taximeter the combination of registering mechanism; a supplemental registering mechanism associated therewith; a gearing associated with said first named mechanism; a second gearing for actuating the first named gearing from the vehicle; means for connecting and disconnecting said gearings; manually actuated means for moving said supplemental registering mechanism; means for locking said manually actuated means from operation; and means associated with said gearing connecting and disconnecting means for automatically releasing said manually actuating means, substantially as described.

13. In a taximeter, the combination of recording and registering wheels, a shaft on which said wheels are mounted, means for actuating said wheels comprising a pinion, a resilient driving connection between said pinion and one of said wheels, a device carried by said wheel for holding the same to the shaft for restraining movement of said wheel during rotation of the pinion whereby to tension said resilient connection, a device on said pinion adapted to automatically release such restraint and permit said wheel to rotate, and a transferring mechanism for imparting movement to said wheels in seriatim.

14. In a taximeter, the combination of recording and registering wheels, means for actuating said wheels comprising, a pinion having a recess providing a shoulder, a resilient driving connection between said pinion and one of said wheels, a stub shaft on said wheel projecting through said recess, a pawl on said stub shaft, a member engaging with said pawl and restraining movement of said wheel during rotation of the pinion whereby to tension said resilient connection, said shoulder on said pinion adapted to automatically effect the release of said pawl and permit the wheel to rotate, and a transferring mechanism for imparting movement to said wheels in seriatim.

15. In a taximeter, the combination of recording and registering wheels, a shaft on which said wheels are mounted, a ratchet wheel mounted on said shaft, means for actuating said wheels comprising, a pinion having a recess providing a shoulder, a resilient connection between said pinion and one of said wheels, a stub shaft on said wheel projecting through the recess in the pinion, a pawl on said stub shaft adapted to engage with the ratchet wheel and restrain movement of said wheel during rotation of the pinion, a pin on said pawl adapted to engage with the shoulder of said pinion and effect the release of said pawl to permit of rotation of the wheel, and a transferring mechanism for imparting movement to said wheels in seriatim.

16. In a taximeter, the combination of recording and registering wheels, means for actuating said wheels comprising a pinion, means for driving said pinion, a resilient driving connection between said pinion and one of said wheels, a transferring mechanism, means for restraining said driven wheel during rotation of the pinion, a device for automatically releasing such restraint and permitting said wheel to rotate a determined distance, and manually actuated means for removing such restraint, and effecting initial rotation of said wheel over a distance which is a multiple of the aforesaid pre-determined distance.

17. In a taximeter, the combination of recording and registering wheels, means for actuating said wheels comprising a pinion, a timing element connected with and adapted to drive said pinion, a transferring mechanism, a resilient driving connection between said driven pinion and one of said wheels, means for restraining said wheel during rotation of the pinion, a device for automatically releasing such restraint at determined intervals and permitting said wheel to rotate a determined distance, a shaft adapted to be driven, a driving connection between said shaft and said pinion, and a manually actuated means for effecting restraint of the time driving element and bringing the pinion into driving connection with the driven shaft.

18. In a taximeter, the combination of recording and registering wheels, a pinion having driving connection with one of said wheels, a transferring mechanism, means for temporarily restraining said wheel during rotation of said pinion, means for automatically releasing such restraint and permitting said wheel to rotate a determined distance, manually actuated means adapted to effect initial movement of said wheel, a timing element and driving connection with and adapted to drive said pinion, a gearing having driving connection with said pinion and adapted to drive the same from an external source, and means associated with said manually actuated device operable to restrain the time driving element and bring said gearing into driving connection with said pinion.

19. In a taximeter, the combination of recording and registering wheels, a pinion having driving connection with one of said wheels, a transferring mechanism, a differential gearing adapted to be connected with said pinion and an external driving element, a timing element connected with and adapted to rotate said pinion, a manually actuated lever, and means actuated by said lever adapted to bring the pinion into driving connection with the lower gear of said differential gearing when said lever is moved to one position, and to bring said pinion into driving connection with the higher gearing thereof when said lever is moved into another position, and to disconnect both of said gears when moved into a third position.

20. In a taximeter, the combination of recording and registering wheels, a shaft on which said wheels are journaled, a pinion journaled on said shaft, a resilient driving connection between said pinion and one of said wheels, means for temporarily restraining said wheel while the pinion is moving, means for automatically releasing such restraint and permitting said wheel to rotate a determined distance, manually actuated means operable to effect initial rotation of said wheel a multiple of such distance, a timing element having driving connection with said pinion, a differential gear adapted to be driven from an external source, means associated with said manually actuated lever operable to restrain the timing element and bring one element of the differential gear into driving connection with said pinion, when the lever is moved to one position; to break said element and bring the outer element of the differential gear into similar driving connection when the lever is moved to another position; to reverse said operations when the lever is moved back to the first mentioned position, and means operated by said lever to disconnect the driving connection with the pinion and actuate a zeroizing mechanism when the lever is returned to normal position.

21. The combination with a recording mechanism comprising a plurality of wheels having printing characters thereon, of a printing and strip feeding mechanism comprising, a frame mounted to oscillate, a pair of drums journaled on said frame, and means for oscillating said frame to bring one of said drums to make the printing impression on the strip, and gearing connections between said drums whereby to rotate the second drum and effect the delivery of the printed strip, as set forth.

22. The combination with a recording mechanism comprising a plurality of wheels having printing characters thereon, of a printing and strip feeding mechanism comprising, a frame mounted to oscillate, a pair of drums journaled on said frame and comprising respectively a platen and a reel, pinions on said drums, a gearing connection between said pinions, a manually operated lever, a cam on said lever adapted to engage with and oscillate said frame and bring the platen drums against the wheels to make an impression on the strip, and a segmental gear on said lever adapted to mesh with the pinion on the reel drum to rotate the same and effect the delivery of the printed strip, as set forth.

23. In a taximeter, the combination of indicating devices, operating means driven by the motion of the vehicle, clockwork mechanism and differential gear mechanism connecting said operating means and said clockwork mechanism with the indicating devices, including a shaft, spring pressed pawl mechanism connected with the clockwork mechanism, gear wheels loosely mounted on said shaft, connections between said gear wheels and the indicating devices, spring pawl devices operatively connected to said gear wheels, a shaft operatively connected to the means driven by the movement of the vehicle, sleeves provided with beveled gear wheels mounted on said last named shaft, an arm having beveled gear wheels on its ends and meshing with said first named bevelled gear wheels, and spur gear wheels carried by said sleeves and meshing with the gear wheels on the first named shaft, substantially as described.

24. In a taximeter, the combination of indicating devices, operating means driven by the motion of the vehicle, clockwork mechanism, differential gear mechanism, connecting said operating means and said clockwork mechanism with the indicating devices, including a shaft, spring-pressed pawl mechanism connected with the clockwork mechanism, gear wheels loosely mounted on said shaft, connections between said gear wheels and the indicating devices, spring pawl devices operatively connected to said gear wheels, a shaft operatively connected to the means driven by the movement of the vehicle, sleeves provided with beveled gear wheels mounted on said last named shaft, an arm having beveled gear wheels on its end and meshing with said first named beveled gear wheels, and spur gear wheels carried by said sleeves and meshing with the gear wheels on the first named shaft and brakes used, substantially as described.

25. In a taximeter, fare printing types, means driven by both time and distance mechanism for actuating said types preparatory to printing, ticket feeding mechanism, and a common manual device for controlling the operative relation between said types and their actuating mechanism and for actuating said ticket feeding mechanism.

26. In a taximeter, fare printing types, time-controlled means for actuating the same preparatory to printing, differential speed-controlled mechanisms for actuating said types in accordance with a plurality of speed ratios, ticket feeding mechanism, and a common means for controlling the operative relation between said types and both said time and speed controlled actuating mechanisms.

27. In a taximeter, fare printing types, a platen, means driven by both time and distance mechanism for actuating said types preparatory to printing, ticket feeding mechanism, and a common manual device for controlling the operative relation between said types and their actuating mechanism and for actuating said platen to print a ticket.

28. In a taximeter, fare printing types, time and distance-measuring means for actuating the same preparatory to printing, ticket feeding mechanism, impression mechanism adapted to coöperate with said types, and a common means for controlling both the impression mechanism and the operative relation between said types and their actuating means.

29. In a taximeter, fare printing types, impression mechanism adapted to coöperate therewith, means for actuating said types preparatory to printing in accordance with a predetermined rate, and a single rotatable setting device for controlling the operative relation between said types and their actuating means and operating said impression mechanism, said setting device being adapted to perform these separate functions during successive angular movements of said setting device.

30. In a taximeter, fare printing types, impression mechanism adapted to coöperate therewith, ticket feeding means, means for actuating said types preparatory to printing in accordance with a predetermined rate, and a single rotatable setting device for controlling the operative relation between said types and their actuating means operating said impression mechanism, and operating said ticket feeding means, said setting device being adapted to perform these separate functions during successive angular movements of said setting device.

31. In a taximeter, ticket printing means comprising movable types and impression mechanism, time and speed measuring means for actuating said types preparatory to printing, ticket feeding means, a revoluble setting device adapted successively to control the operative relation between said types and their actuating means, to operate said impression mechanism and to operate said ticket feeding means, all during a continuous forward angular rotation, and means for preventing backward movement of said setting device.

32. In a taximeter, fare printing types, time and distance measuring means for actuating the same preparatory to printing, impression mechanism, means for controlling operation of the types, means for operating the impression mechanism, and means for interlocking the last named means with the means for controlling operation of the types.

In testimony whereof I affix my signature in presence of two witnesses.

HARRY P. C. BROWNE.

Witnesses:
JULIAN HOWARD,
CLAUDE L. WILSON.